Sept. 27, 1927.
T. L. BRANNEN
PLUG COCK
Filed Feb. 1, 1924
1,643,370
2 Sheets-Sheet 1
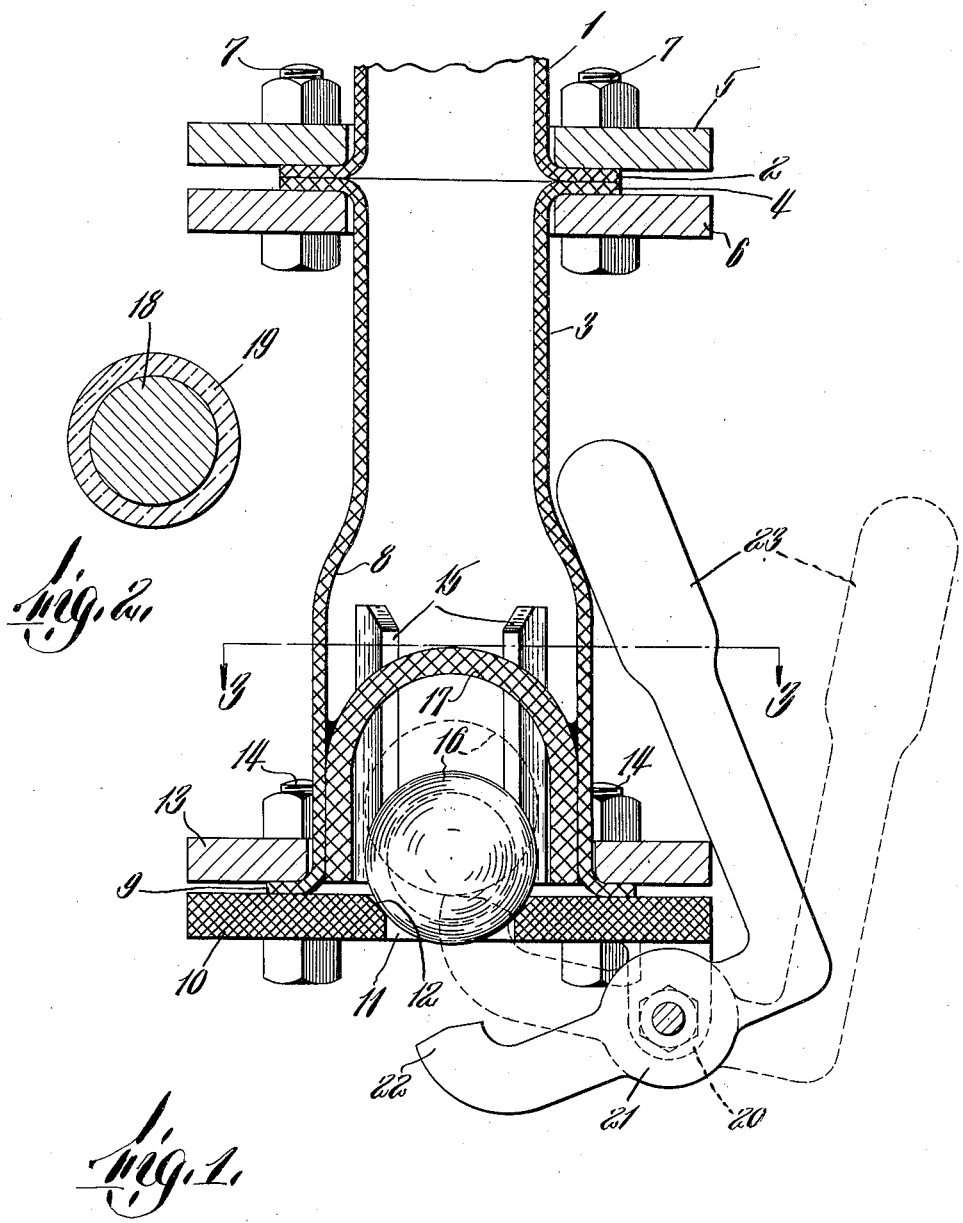
Inventor
Thomas L. Brannen

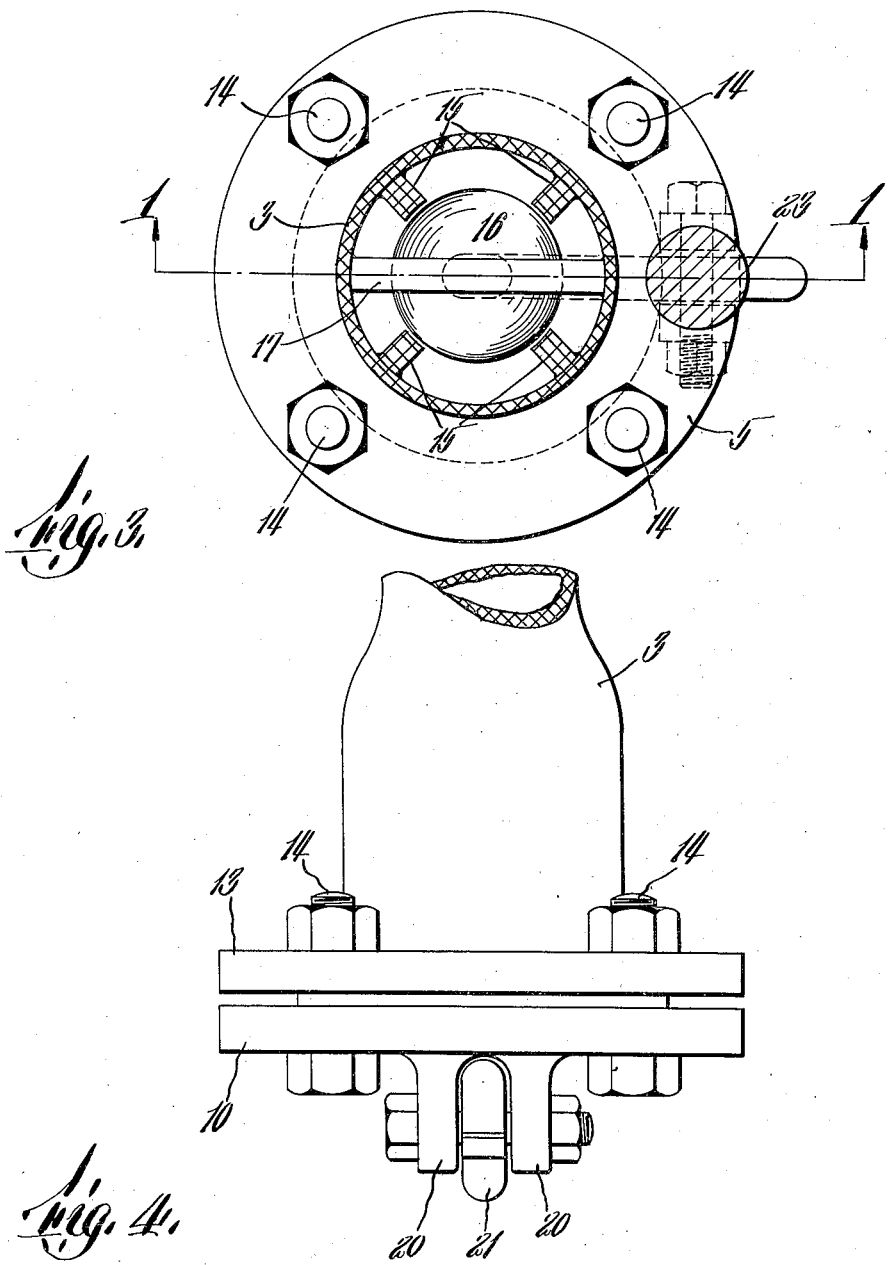

Patented Sept. 27, 1927.

1,643,370

UNITED STATES PATENT OFFICE.

THOMAS L. BRANNEN, OF BERLIN, NEW HAMPSHIRE, ASSIGNOR TO BROWN COMPANY, OF BERLIN, NEW HAMPSHIRE, A CORPORATION OF MAINE.

PLUG COCK.

Application filed February 1, 1924. Serial No. 689,853.

This invention relates to plug cocks particularly intended for use where corrosive liquids are to be handled where it is often quite important to prevent leakage when the valve is closed. Such a valve should be of simple construction, easily actuable and perfectly tight when closed, and of material not subject to rapid deterioration from the liquid the flow of which it is desired to control thereby.

For a more complete understanding of this invention reference may be had to the accompanying drawings in which Figure 1 is a longitudinal section through the valve casing on line 1—1 of Figure 3.

Figure 2 is a cross section through the valve element.

Figure 3 is a transverse section on line 3—3 of Figure 1.

Figure 4 is a side elevation.

The particular embodiment shown in the drawings has been intended more particularly for use in connection with paper manufacture for controlling the flow of alum solution to a beater charge, consequently the materials of which the valve are made are such as to resist corrosion from this material.

Referring first to Figure 1, at 1 is indicated a pipe leading from the source of supply, this pipe being formed of lead and having at its outer extremity an outwardly turned flange 2. The valve casing comprises a similar pipe 3 having an outwardly turned flange 4 at its upper end and the flanges 2 and 4 are held clamped together by a pair of flange elements or rings 5 and 6 between which the flanges 2 and 4 extend and which are drawn together by means of bolts 7. The pipe 3 at its lower end is of enlarged diameter as shown at 8 and its lower end is formed with an outwardly directed flange 9. Partly closing the open end of this pipe is a plate or disk 10 having an aprture 11 having at its upper or inner end a valve seat 12. The disk is clamped against the outwardly directed flange 9 of the pipe 3 by means of a flange member or ring 13 engaging the upper face of the flange 9 and fixed to the plate or disk 10 by means of clamping bolts 14. Within the enlarged portion 8 of the pipe 3 are guide pieces 15 spaced circumferentially thereof between which is positioned a spherical valve element 16. To limit the movement of this valve element between the guideways in a direction away from the seat 12 is a yoke member 17 which bridges diametrically across the interior of the enlarged portion of the pipe 8. This yoke member and the guides 15 form a cage within which the valve element may move toward and from the valve seat 12.

The valve element 16 is shown detached in Figure 2. It comprises a central ball core 18 which may be of steel having a covering 19 of soft resilient material such as soft rubber.

Depending from the disk 10 are spaced lugs 20 between which is pivoted a lever 21. One end of this lever is formed with an upturned end 22 arranged to impinge on the valve element 16 from beneath the disk 10 so that by swinging of this lever into the dotted line position shown in Figure 1, the spherical valve element is removed from its seat thereby opening the valve. As soon as the lever is moved to its full line position the ball valve element is permitted to seat itself on the valve seat 12, the force of the liquid controlled thereby, as well as gravity, acting to return the valve to its seating position. The lever 21 is provided with an operating handle 23 by which it may be manipulated.

The disk 10 and the guides 15 and yoke 17 are all made of material substantially non-corrosive to the liquid to be handled, in the particular embodiment shown, being made of lead. The flange or ring elements 5, 6 and 13 serve to reinforce the relatively soft flanges at the ends of the lead pipe sections and to effect sealing engagement therebetween and may be made of a relatively stiff material such as cast iron.

It will thus be seen that all the parts exposed to the liquid to be controlled are of non-corrosive material and that the spherical valve element is coated with material which causes it to firmly seat when the valve is closed thus preventing leakage. In practice there appears to be no appreciable wear on this valve element such as would be likely to cause leakage during an extended period of use so that the valve is not liable to drip.

Having thus described an embodiment of this invention it should be evident that various changes and modifications might be made therein without departing from its spirit or scope as defined by the appended claims.

I claim:

1. A device of the class described comprising a pipe having an outwardly flanged end, a disk having a valve seat and partially closing said end, a ring surrounding said pipe adjacent to said flange, means to clamp said flange between said disk and ring to retain said disk in position, a spherical valve element within said pipe and normally engageable with said seat, a cage in said pipe for limiting the movement of said valve element from said seat, and a lever pivoted to said disk outwardly of said pipe and having an arm movable to contact with said valve element and remove it from said seat.

2. A valve comprising a pipe of relatively soft noncorroding material having a flanged end, a valve seat member of similar material comprising a disk having a valve seat therein arranged against the outer face of said flange, a ring of relatively stiff material engaging the opposite side of said flange, means for clamping said flange between said ring and disk, a valve element within said pipe engageable with said seat, and a lever pivotally mounted on said disk and having a portion engageable with said element and actuable to force said element from said seat.

3. A valve for corrosive liquids, comprising a pipe having an outwardly flanged end, a valve seat member having a valve seat therein and arranged against the outer face of said flange, a ring engaging the opposite side of said flange, means for clamping said flange to said ring member, a spherical valve element having a covering of rubber within said pipe and normally engageable with said seat, members for guiding and a cage for limiting the movement of said valve element from said seat within said pipe, and a lever having an arm movable to contact with said valve element and remove it from said seat, all parts exposed to the liquid being made of non-corroding material.

In testimony whereof I have affixed my signature.

THOMAS L. BRANNEN.